United States Patent
Costabeber et al.

(10) Patent No.: US 11,186,039 B2
(45) Date of Patent: Nov. 30, 2021

(54) STEREOLITHOGRAPHY SYSTEM OF IMPROVED TYPE

(71) Applicant: DWS S.R.L., Thiene (IT)

(72) Inventors: Ettore Maurizio Costabeber, Zane' (IT); Renzo Busato, Marano Vicentino (IT)

(73) Assignee: DWS S.R.L, Thiene (IT)

( * ) Notice: Subject to any disclaimer, the term of this patent is extended or adjusted under 35 U.S.C. 154(b) by 93 days.

(21) Appl. No.: 16/761,457

(22) PCT Filed: Nov. 12, 2018

(86) PCT No.: PCT/IB2018/058869
§ 371 (c)(1),
(2) Date: May 4, 2020

(87) PCT Pub. No.: WO2019/097390
PCT Pub. Date: May 23, 2019

(65) Prior Publication Data
US 2020/0391438 A1    Dec. 17, 2020

(30) Foreign Application Priority Data

Nov. 14, 2017   (IT) .................. 102017000129468

(51) Int. Cl.
*B29C 64/25*     (2017.01)
*B33Y 30/00*     (2015.01)
(Continued)

(52) U.S. Cl.
CPC ............ *B29C 64/25* (2017.08); *B29C 64/232* (2017.08); *B29C 64/255* (2017.08); *B33Y 30/00* (2014.12)

(58) Field of Classification Search
CPC ...... B29C 64/25; B29C 64/232; B29C 64/255
See application file for complete search history.

(56) References Cited

U.S. PATENT DOCUMENTS

| | | | |
|---|---|---|---|
| 5,122,441 A * | 6/1992 | Lawton | B29C 64/129 430/320 |
| 9,452,567 B2 * | 9/2016 | Syao | B29C 64/124 |
| 2015/0183168 A1 | 7/2015 | Liverman et al. | |

FOREIGN PATENT DOCUMENTS

WO   2015/072921 A1   5/2015

OTHER PUBLICATIONS

International Search Report and Written Opinion dated Mar. 4, 2019, issued in PCT application No. PCT/IB2018/058869, filed Nov. 12, 2018.

* cited by examiner

*Primary Examiner* — Galen H Hauth
*Assistant Examiner* — Asha A Thomas
(74) *Attorney, Agent, or Firm* — Volpe Koenig (57) ABSTRACT

A stereolithography system includes a tank provided with a bottom and a stereolithography machine provided with a supporting frame and with a supporting structure operatively associated with the supporting frame and defining a housing configured to accommodate the tank. The tank includes a duct made of a deformable material and having a first mouth and a second mouth in fluid-dynamic communication with the tank; the supporting structure is configured in such a way as to assume, with respect to the supporting frame, a first position and a second position in which the tank is in an inclined position with respect to the bearing plane of the supporting frame, and the stereolithography machine includes a counteracting mechanism configured to be placed into contact with the duct in that second position.

11 Claims, 6 Drawing Sheets

(51) Int. Cl.
*B29C 64/232* (2017.01)
*B29C 64/255* (2017.01)

STEREOLITHOGRAPHY SYSTEM OF IMPROVED TYPE

BACKGROUND OF THE INVENTION

1. The Field of the Invention

The present invention concerns a stereolithography system comprising a tank suited to contain a light sensitive liquid substance and a stereolithography machine, wherein said stereolithography system makes it possible to quicken and simplify the stereolithography processes employed for producing three-dimensional objects.

2. The Relevant Technology

As is known, a stereolithography machine is used to produce complex three-dimensional objects starting from a light sensitive liquid substance, preferably a light sensitive resin, which is polymerized in layers by means of a light beam. In order to simplify the description, the word "resin" will simply be used from now on in order to indicate a light sensitive resin or any other light sensitive liquid substance equivalent to a light sensitive resin used in a stereolithography process for the production of three-dimensional objects.

It is also known that a stereolithography machine comprises a tank suited to contain said resin and a modelling plate which faces the bottom of the tank, in a substantially parallel position, and supports the three-dimensional object being formed. The modelling plate is associated with a moving unit designed to move the plate itself according to a direction of movement which is substantially orthogonal to the bottom of the tank. In order to make each layer of the object, the surface of the preceding layer, or the modelling surface of the modelling plate in the case of the first layer, is immersed in the resin until it reaches a position in which its distance from the bottom of the tank is equal to the thickness of the layer to be obtained, in such a way as to define a corresponding layer of liquid resin. Successively, said resin layer is polymerized through irradiation by means of a light beam originating from the transparent bottom of the tank.

In particular, according to the stereolithography method, between the polymerization of a layer and the polymerization of the successive layer the modelling plate is moved away from the bottom, in such a way as to make the solidified layer emerge from the liquid resin and thus allow the thickness of the liquid resin layer necessary for processing the successive layer to be restored.

In fact, when the modelling plate and the solidified layer are lifted, a depression is left in the liquid resin, which is filled by the spontaneous flow of the resin itself.

Said levelling operation restores the thickness of the liquid resin layer which is necessary for the solidification of a new layer of the object and furthermore prevents air bubbles which may affect the integrity of the successive layer of the three-dimensional object from remaining entrapped in the liquid resin during the successive lowering of the modelling plate.

Once said depression has been spontaneously levelled, the modelling plate, as already explained, is immersed in the liquid resin again and a further layer of the object is solidified.

The method described above poses the drawback that the overall processing cycle designed to obtain the three-dimensional object is lengthened considerably by the waiting times necessary for the levelling of the liquid resin after the solidification of each layer of the object.

Since the number of layers forming an object obtained through stereolithography can amount to several hundreds, it can be understood that said waiting times involve a considerably longer duration of the processing cycle.

Obviously, the waiting times are proportional to the viscosity of the liquid resin used.

In order to overcome the above mentioned drawback, stereolithography machines have been designed which comprise levelling means, preferably a spatula, in contact with the resin and configured so that they intervene when the modelling plate is lifted, in order to push the resin towards the depression.

More specifically, said levelling means are associated with motorization means which are configured so as to move said levelling means with respect to the bottom of the tank, in such a way as to redistribute it and level its upper surface.

It is clear that this operation makes it possible to fill said depression more rapidly compared to the spontaneous redistribution of the resin described above. Consequently, the overall processing times required for the production of a three-dimensional object are reduced compared to the times which are required when using stereolithography machines that are not provided with said levelling means.

However, this last solution known in the art involves a more complex structure of the stereolithography machine itself, since it is necessary to provide an additional element and the related moving system, which are not present in the stereolithography machines described above. Furthermore, to disadvantage, it is known that said levelling means intervene only after the modelling plate has been lifted to a height sufficient to allow the levelling means themselves to slide through the space defined between the plate and the underlying tank. Therefore, even though the stereolithography machines comprising said levelling means make it possible to reduce the production times of the three-dimensional objects compared to the stereolithography machines that are not provided with said levelling means, the precise sequence of operations described above, in any case, disadvantageously involves non-negligible processing times.

SUMMARY OF THE INVENTION

The present invention intends to overcome all the drawbacks described above and related to the known art.

More specifically, it is an object of the invention to provide a stereolithography system that makes it possible to produce a three-dimensional object through the solidification of a liquid resin in layers more rapidly compared to the stereolithography machines known in the art, though featuring the same structural complexity as some types of stereolithography machine known in the art.

At the same time, it is a further object of the invention to provide a stereolithography machine having a simpler structure compared to some types of stereolithography machine known in the art, though requiring the same processing time for producing the same three-dimensional object.

It is a further object of the invention to provide a stereolithography machine that makes it possible to use a smaller quantity of resin compared to the quantity of resin required when stereolithography machines of the known art are used.

The objects illustrated above are achieved by a stereolithography system for producing a three-dimensional object in layers according to claim 1.

Further detailed characteristics of the invention are described in the related dependent claims.

Advantageously, the stereolithography system of the invention makes it possible to obtain the recirculation of the resin inside the tank. Consequently, still to advantage, the stereolithography machine of the invention makes it possible to vary the colour of the resin in a rapid and progressive manner, by introducing, in successive moments, pigments in different shades or resins of different colours that are rapidly and homogeneously mixed and amalgamated with the resin already present in the tank. In this way, therefore, with the stereolithography machine of the invention it is possible to produce, in a simple and rapid manner, three-dimensional objects with layers having different colours, wherein each layer has a homogeneous colour.

A further advantage of the stereolithography system that is the subject of the invention lies in that with said function of recirculation of the resin inside the tank it is possible to carry out a cleaning operation intended to clean the tank itself between a stereolithography cycle and the following one, with no need for the intervention of an operator.

Another advantage obtained through the stereolithography system of the invention is the simplified introduction of the tank in the stereolithography machine.

BRIEF DESCRIPTION OF THE DRAWINGS

The objects and the advantages illustrated above, together with others that will be illustrated below, are all highlighted in the description of some preferred embodiments of the invention which are provided by way of non-limiting example with reference to the attached drawings, wherein.

DETAILED DESCRIPTION OF THE PREFERRED EMBODIMENTS

Figure 1:
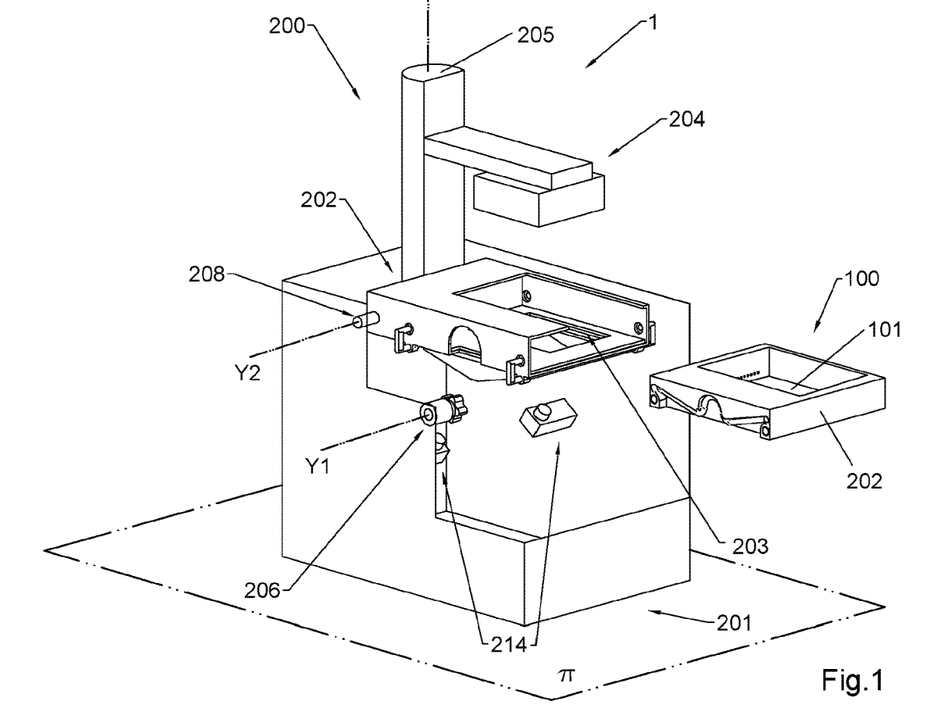
FIG. 1 shows an axonometric view of the stereolithography system which is the subject of the invention.
Figure 2:
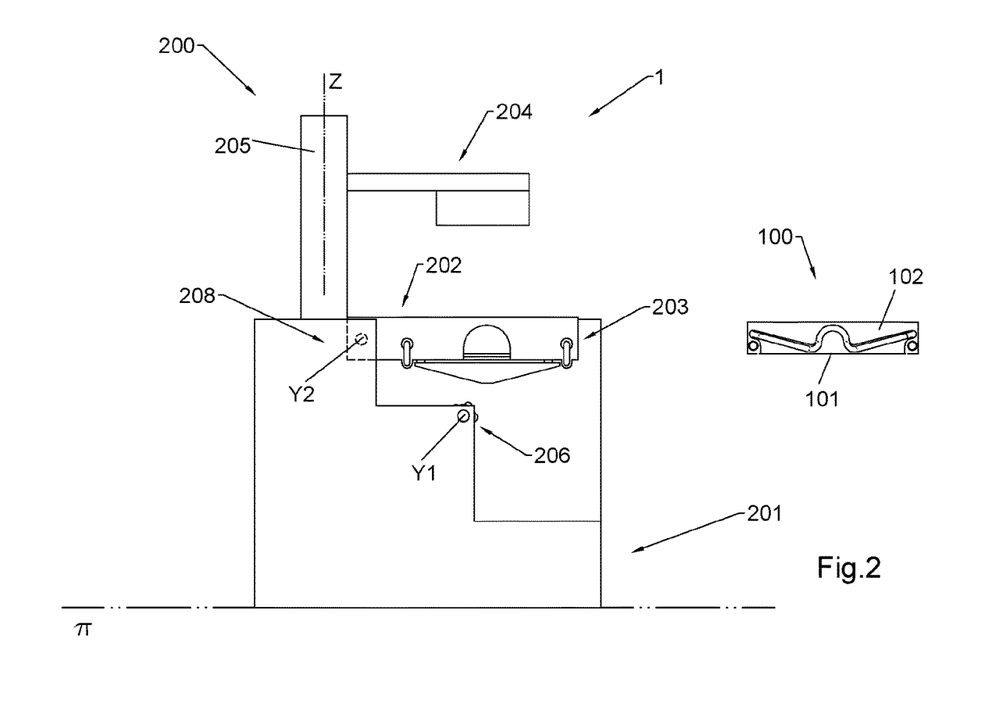
FIG. 2 shows a side view of the stereolithography system which is the subject of the invention.

The stereolithography system of the invention, represented as a whole in FIGS. 1 and 2, where it is indicated by 1, comprises a containment tank 100 and a stereolithography machine 200.

Among other things it should be underlined that the following description and the scope of protection requested with this application concern said stereolithography system 1 as a whole, comprising, as specified above, a containment tank 100 and a stereolithography machine 200.

It cannot be excluded, however, that the applicant may claim protection both of the tank 100 only and of the stereolithography machine 200 only, as described below, with no need to necessarily associate each one of them with the other one. In fact, the tank 100 and the stereolithography machine 200 individually allow the achievement of some technical advantages described here below.

Making reference again to the description of the characteristics of the stereolithography system 1 of the invention, concerning specifically the tank 100, this is clearly configured to contain a light sensitive liquid substance, in particular a resin, and is provided with a bottom 101, preferably transparent, delimited by side walls 102. Obviously, the transparent bottom is necessary in the case where the tank 100 is associated with a stereolithography machine, such as the stereolithography machine 200, in which the radiation emission source, not shown in the figures, is arranged under the tank 100 itself.

As to said stereolithography machine 200 belonging to the stereolithography system 1 of the invention, as shown in FIGS. 1 and 2, this is provided with a supporting frame 201 suited to be rested on a bearing plane π which is usually horizontal, such as, for example, the upper surface of a workshop table.

The stereolithography machine 200 furthermore comprises a supporting structure 202 which is operatively associated with the supporting frame 201 and defines a housing 203 configured so as to accommodate the tank 100 in a reversible manner.

More precisely, as is described in greater detail below, said supporting structure 202 allows the operator to insert/extract the tank 100 in/from the housing 203 in a simplified manner.

The stereolithography machine 200 comprises also a modelling plate 204 which faces the bottom 101, in a substantially parallel position, when the tank 100 is introduced in said housing 203. As will be shortly clear, this condition must be understood as existing also for a single position that the tank 100 can assume with respect to said stereolithography machine 200.

Furthermore, the stereolithography machine 200 includes a moving unit 205 which is coupled with the supporting frame 201 and configured so as to move the modelling plate 204 above the tank 100 according to a direction of movement Z substantially perpendicular to the bottom 101 when the tank 100 itself is introduced in the housing 203, and for at least said single position. Furthermore, the stereolithography machine 200 comprises said radiation emission source, not represented in the figures, arranged under the supporting structure 202 and thus under the tank 100 introduced in said housing 203.

According to the invention, the stereolithography system 1 has a series of further characteristics which are described here below.

Figure 3:
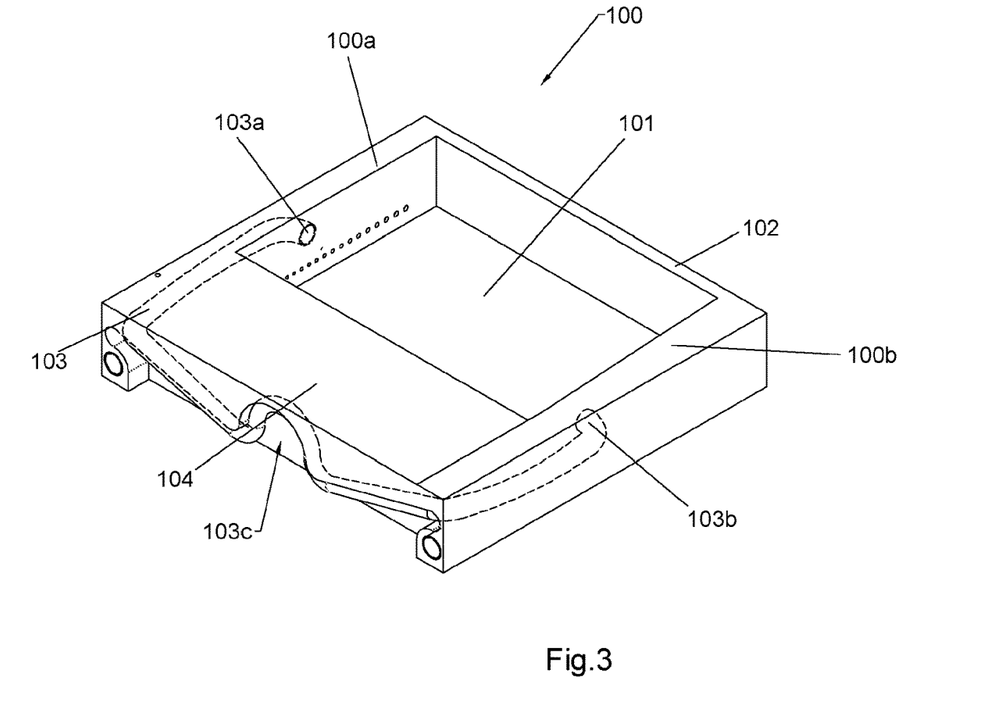
FIG. 3 shows an axonometric view of the containment tank belonging to the stereolithography system shown in FIGS. 1 and 2.
Figure 4:
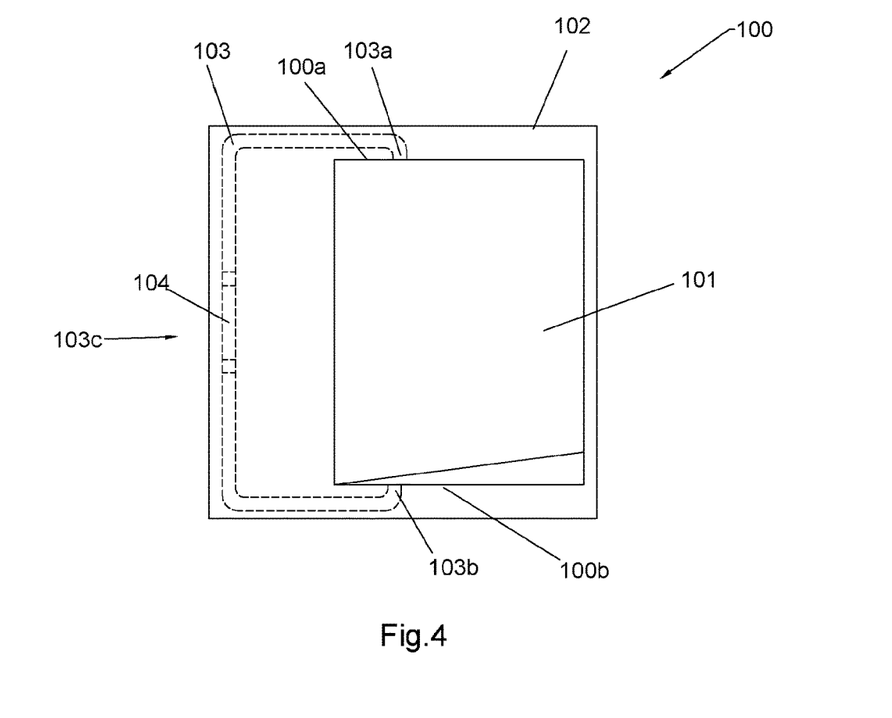
FIG. 4 shows a top view of the containment tank belonging to the stereolithography system shown in FIGS. 1 and 2.

As regards the tank 100, as shown in FIGS. 3 and 4, it comprises a duct 103 made of a deformable material and having a first mouth 103a and a second mouth 103b in fluid-dynamic communication respectively with a first end 100a and with a second end 100b, opposite the first end, of the tank 100 itself. Preferably, said duct 103 in a deformable material is made of an elastomeric material.

Said duct 103 advantageously defines a recirculation circuit for the resin present in the tank 100. Preferably, the duct 103 is inserted in a housing defined in the tank 100. It cannot be excluded, however, that the duct 103 passes entirely outside the side walls 102 of the tank 100. However, in both cases, in the duct 103 there must be at least one section 103c that can be reached from the outside of the tank 100 and at the same time is arranged against a counteracting wall 104 that can be identified on the tank 100, as can be seen in FIG. 3.

Concerning, again, the supporting structure 202 belonging to the stereolithography machine 200, this is configured in such a way that it can assume, with respect to the supporting frame 201, at least a first position, shown in FIGS. 6a and 6b and also defined here below as position of introduction, intended to allow the simplified introduction of the tank 100 in the housing 203, and at least one second position, shown in FIGS. 7a and 7b and also defined here below as operating position, in which the tank 100 is inclined with respect to the bearing plane π.

According to the preferred embodiment of the invention, the radiation emission source and the moving unit 205 are associated with the supporting structure 202 in a fixed manner. Therefore, also the radiation emission source and the moving unit 205 are configured to assume said two positions together with the supporting structure 202.

In this context, the moving unit 205 is configured in such a way as to translate the modelling plate 204 along said direction Z perpendicular to the bottom 101 of the tank 100 when the latter is introduced in the housing 203 for both of said positions.

According to alternative embodiments of the invention, it cannot be excluded, however, that the radiation emission source and the moving unit 205 may be not fixedly connected to the supporting structure 202 and are respectively configured to emit the light radiation towards the bottom 101 of the tank 100 and to translate the modelling plate 204 along said direction Z perpendicular to the bottom 101 only when the supporting structure 202 itself is in said second operating position.

Figure 6A:
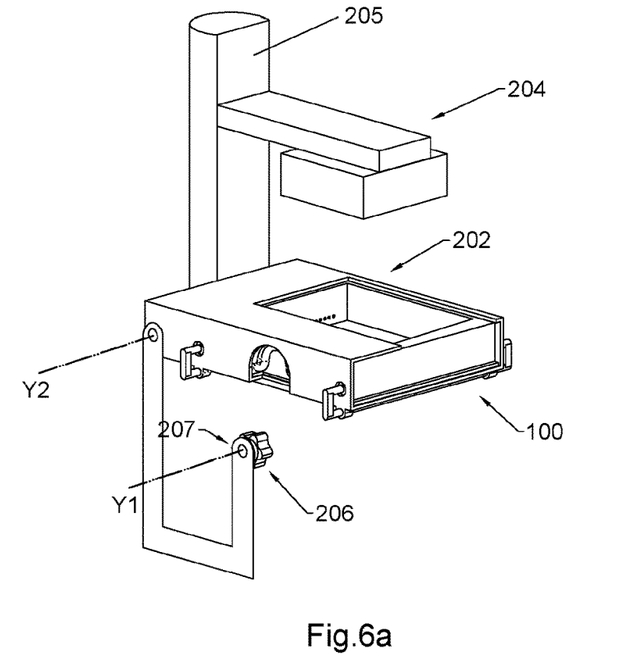
FIGS. 6a and 6b schematically show the supporting structure of the stereolithography machine and the containment tank belonging to the stereolithography system of the invention, respectively according to an axonometric view and to a side view in a second configuration of introduction and both arranged in a first position with respect to the counteracting means of the supporting frame.
Figure 6B:
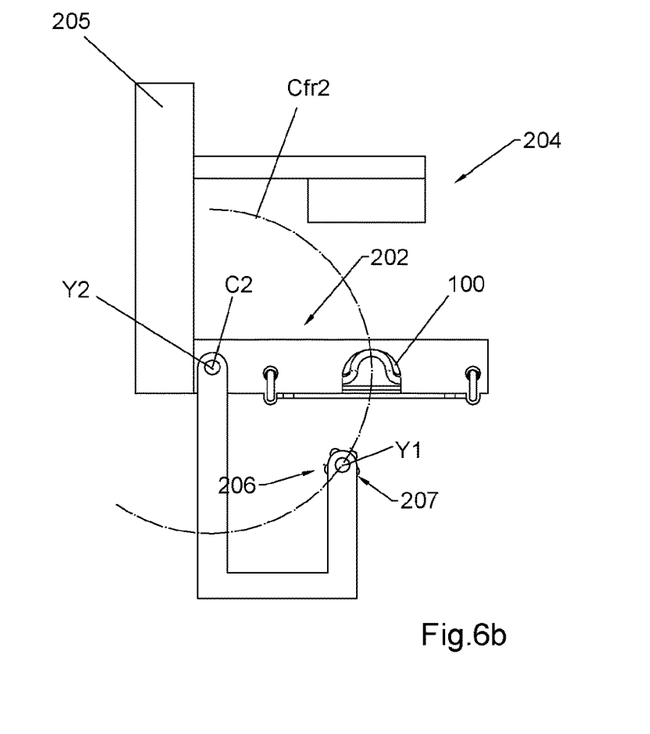
Figure 7A:
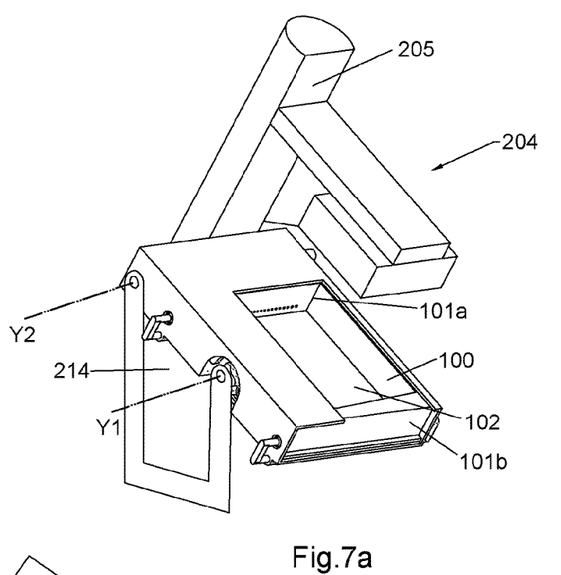
FIGS. 7a and 7b schematically show the supporting structure of the stereolithography machine and the containment tank belonging to the stereolithography system of the invention, respectively according to an axonometric view and to a side view in a second configuration of introduction and both arranged in a second position with respect to the counteracting means of the supporting frame.
Figure 7B:
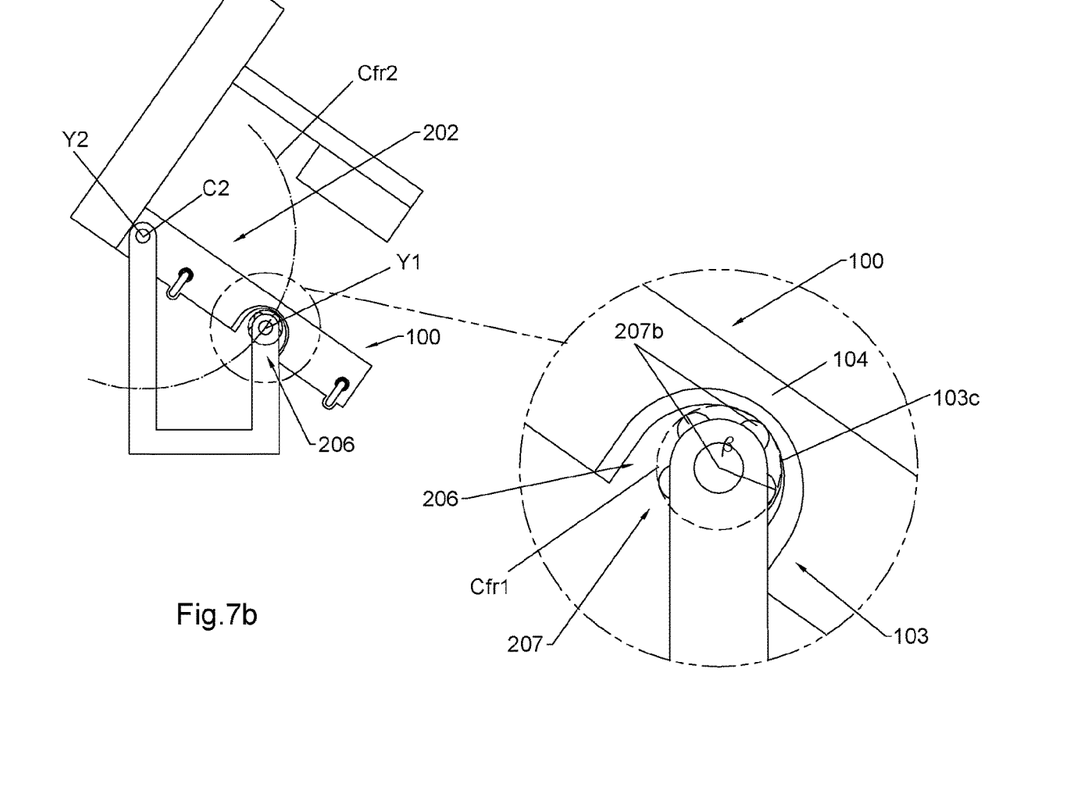

Furthermore, according to the invention, the stereolithography machine 200 comprises also counteracting means 206 which are configured so that they rotate around their rotation axis Y1 and are associated with the supporting frame 201 so that when the tank 100 is introduced in the housing 203 they are released from said section 103c of the duct 103 at the level of said first position, as shown in FIGS. 6a and 6b, and in such a way that, on the contrary, they are in contact with the section 103c, on the opposite side of the counteracting wall 104, in said second position, as shown in FIGS. 7a and 7b.

In other words, advantageously, in said second position the association between the section 103c and the counteracting means 206 and the successive rotation of the latter around the rotation axis Y1 make it possible to define a peristaltic system for the recirculation of the resin inside the tank 100. Even more precisely, the rotation of the counteracting means 206 in contact with said section 103c makes it possible to narrow the same section 103c, in cooperation with the counteracting wall 104, for a given angular interval β and thus to apply the principle of peristalsis to the duct 103.

At this point, before proceeding with the description of the characteristics of the stereolithography system 1 of the invention according to the preferred embodiment, it is appropriate to highlight the technical advantages obtained from the combination of said three characteristics of the stereolithography system 1 of the invention and just introduced above.

First of all, the inclined configuration of the bottom 101 of the tank 100 with respect to the bearing plane π in said second operating position, which is obviously the position in which the three-dimensional object is actually printed, makes it possible to exploit the force of gravity for the flow of the resin introduced at the level of the first end 101a of the tank 100 itself, arranged in a higher position than the second end 101b.

Therefore, the solution proposed by the invention advantageously makes it possible to rapidly fill the depression which is produced by the lifting of the modelling plate 204 once a layer has been finished, as described above, even if the stereolithography machine 200 is not equipped with said levelling means. On the other end, the time necessary for the flow of the resin due to gravity is comparable to, if not shorter than the time required by the levelling operation carried out through said levelling means.

In this regard, in fact, in the moment when the modelling plate 204 is in a lowered position and immersed in the resin during the creation of a layer of the three-dimensional object, the resin present at the level of the first end 101a of the tank 100 tends to move downwards due to gravity and to come into contact with and accumulate on the upper edge of the modelling plate 204. This situation remains stable so long as the modelling plate 204 remains lowered during the creation of a specific layer of the object. Once the modelling plate 204 has been lifted, after the creation of said layer, and consequently after the creation of said depression, advantageously, the resin accumulated at the level of the upper edge of the same modelling plate 204 can immediately flow downwards due to gravity and thus rapidly fill the previously formed depression.

Furthermore, the fact that a peristaltic system is defined at the level of the second operating position advantageously makes it possible, as mentioned above, to recirculate the resin inside the tank 100 during the printing step, so that during the entire stereolithography process it will be possible to have a quantity of resin, distributed on the bottom 101 of the tank 100 itself, which is sufficient to create the individual layers that will make up the three-dimensional object being produced.

Furthermore, the presence of said peristaltic system makes it possible to maintain the resin constantly mixed and thus homogeneous inside the tank 100 itself.

Finally, still to advantage, the existence of said two positions, the first position of introduction, in which said supporting structure 202 and the corresponding housing 203 are substantially in horizontal position and released from the counteracting means 206, and the second operating position, in which, instead, the same supporting structure 202 and thus the tank 100 are arranged in an inclined position with respect to the bearing plane π and in which, furthermore, the section 103c of the duct 103 is constrained to the counteracting means 206, on the one side makes it possible to obtain the advantages illustrated above during the processing cycle and, on the other side, makes it easier for the operator to introduce the tank 100 in the housing 203 in said first position.

Figure 5A:
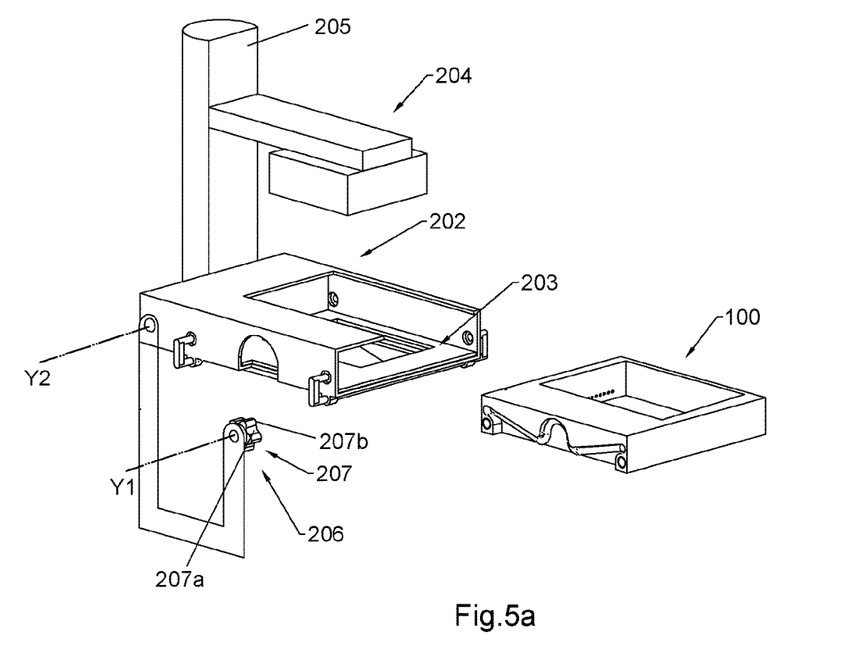
FIGS. 5a and 5b schematically show the supporting structure of the stereolithography machine and the containment tank belonging to the stereolithography system of the invention, respectively according to an axonometric view and to a side view, in a first configuration in which the tank is not introduced in the machine.
Figure 5B:
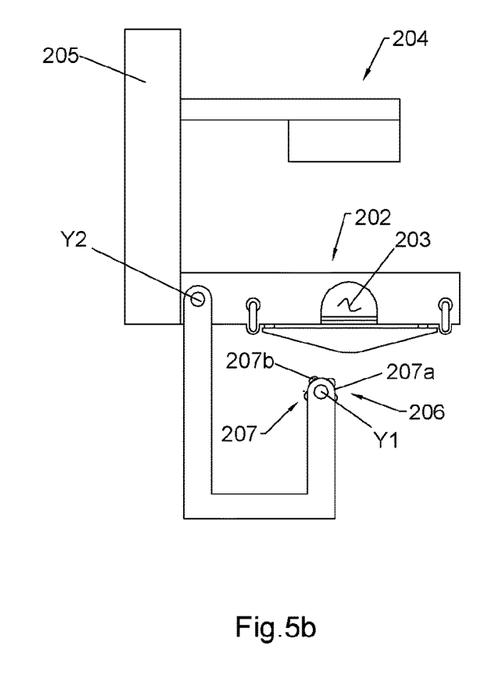

In fact, as shown in FIGS. 5a and 5b, in said first position of introduction the housing 203 can be accessed according to a substantially horizontal direction, thus allowing the tank 100 to be accessed more comfortably than in the second operating position.

Considering now a preferred but non-limiting embodiment of the stereolithography system 1 of the invention, first of all in this embodiment the inclination angle of the supporting structure 202 and thus of the tank 100 with respect to the bearing plane π in said second operating position is defined as equal to or larger than 20°, preferably 35°.

Furthermore, as far as the tank 100 is concerned, as can be observed in the detailed view of FIG. 5b, in the preferred embodiment of the invention the section 103c of the duct 103 is defined along a trajectory a1 in the shape of an arc of a circle Crf1. More specifically, said arc-shaped trajectory a1 of the section 103c is defined in such a way that when the tank 100 is introduced in the housing 203, and in both of said positions, its concave part faces towards the counteracting means 206, as shown both in FIG. 6b and in FIG. 7b.

As far as the counteracting means 206 are concerned, in the preferred embodiment of the invention they preferably but not necessarily comprise a rotor 207 provided with a main body 207a at the centre of which the rotation axis Y1 is defined and the periphery of which is coupled with at least one counteracting element 207b that can be placed into contact with the section 103c on the opposite side of the counteracting wall 104 when the tank 100 is introduced in the housing 203 and is located at the level of the second operating position. Thus, this allows said counteracting element 207b to narrow, in cooperation with the counteracting wall 104, the section 103c over a determined angular interval β during the rotation of the rotor 207.

More specifically, according to the preferred embodiment of the invention, when the supporting structure 202 and thus the tank 100 are in the second operating position, the rotation axis Y1 of the rotor 207 substantially passes through the centre of said circle Crf1, as shown in the detailed view of FIG. 7b.

In order to allow the position of the tank 100 to be changed, passing from the first position of introduction to the second operating position and vice versa, according to the preferred embodiment, in the stereolithography machine 200 the supporting structure 202 is operatively associated with the supporting frame 201 through inclination means 208, preferably constituted by a hinge system associated with an actuator, defining a rotation axis Y2 substantially parallel to the bearing plane π.

Again, preferably but not necessarily, said rotation axis Y2 of the inclination means 208 and the rotation axis Y1 of the counteracting means 206 are defined in such a way that they are substantially parallel to each other and to the bearing plane π, as shown in FIGS. 1 and 2.

Furthermore, as can be observed in FIGS. 6b and 7b, according to the preferred embodiment of the invention the supporting structure 202 and the counteracting means 206 are associated with the supporting frame 201 in such a way that, when the tank 100 is introduced in said housing 203, the section 103c of the duct 103 and the rotation axis Y1 of said counteracting means 206 substantially lie along the same circle Crf2 whose centre C2 is one of the points of the rotation axis Y2 of the inclination means 208. This advantageously allows said counteracting means 206 to reach and come into contact with said section 103a when the supporting structure 202 and thus the tank 100 are moved from the first position to the second position.

As explained above, according to the preferred embodiment of the invention, the radiation emission source and the moving unit 205 are fixedly associated with the supporting structure 202. Therefore, also the radiation emission source and the moving unit 205 are configured in such a way that they can assume said two positions together with the supporting structure 202 through said inclination means 208.

Figure 8A:
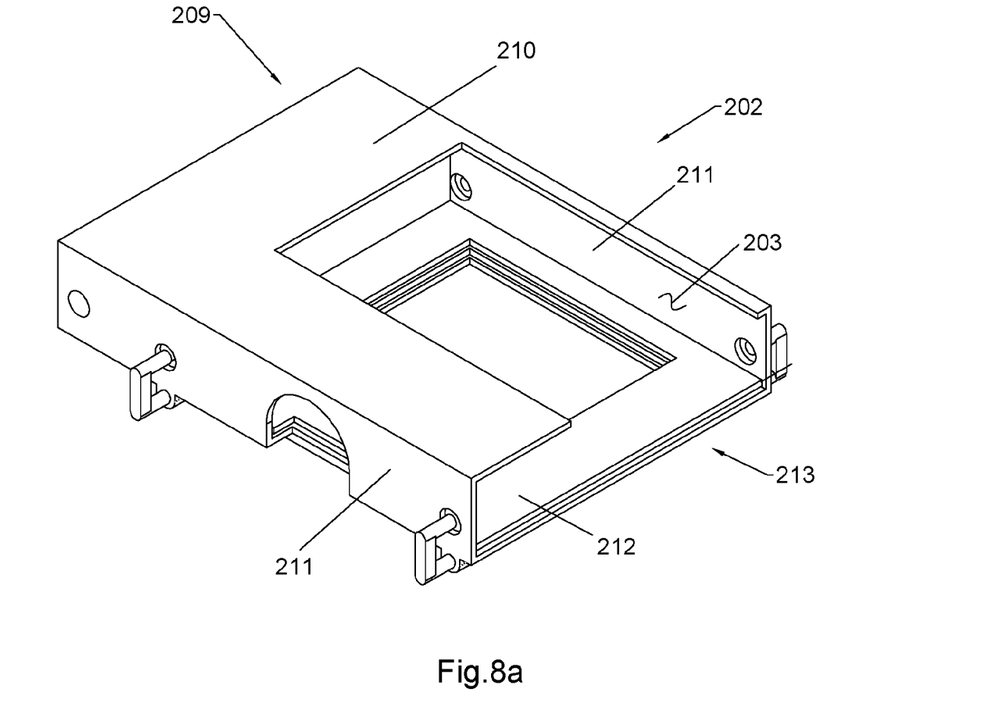
FIGS. 8a and 8b schematically show, according to a preferred embodiment of the invention, the supporting structure of the stereolithography machine belonging to the stereolithography system of the invention, respectively according to an axonometric view and according to a side view.
Figure 8B:
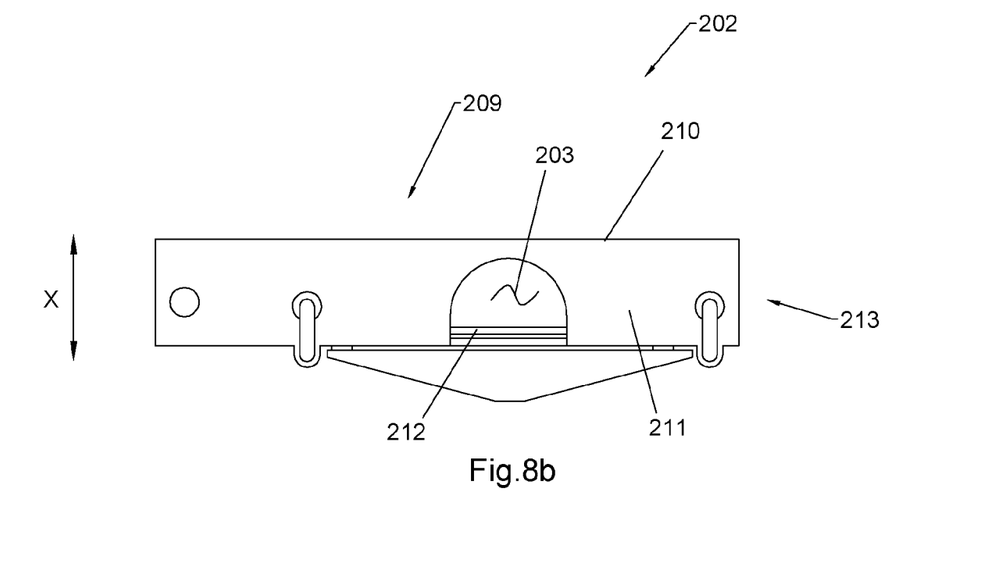

Regarding, specifically, the supporting structure 202, according to the preferred embodiment of the invention, as shown in FIGS. 8a and 8b, it comprises a box-shaped structure 209 inside which the housing 203 is defined. In particular, said housing 203 is defined by a top 210, which is at least partially open in order to allow the modelling plate 204 to reach the inside of the tank 100 from above, by at least two side walls 211 projecting from the underside of the same top 210, and by a bottom 212. Even more specifically, according to the preferred embodiment of the invention, said bottom 212 is operatively associated with the side walls 211, in such a way as to allow the former to translate with respect to the same side walls 211 according to a direction of translation X which is substantially orthogonal to the top 210. In other words, when subjected to an external force, as explained below, said bottom 212 can be moved along said direction of translation X with respect to the top 210.

Furthermore, in the stereolithography machine 200 that is the subject of the invention the box-shaped structure 209 comprises at least one opening 213 configured to allow the tank 100 to be introduced in the housing 203, for at least said first position of introduction. Preferably, but not necessarily, the opening 213 is made at the level of the side 209a of the same box-shaped structure 209 opposite the side 209b to which the inclination means 208 are associated, in such a way as to allow the tank 100 to be introduced in the housing 203 from the front of the stereolithography machine 200.

In combination with said configuration of the box-shaped structure 209, the stereolithography machine 200 that is the subject of the invention also features a thrusting unit 214 fixed to the supporting frame 201 under the same box-shaped structure 209.

In particular, as shown in FIGS. 7a and 7b, the thrusting unit 214 is configured to counteract the lower surface of said bottom 212 and thus to limit the translation of the latter during the movement of the box-shaped structure 209 from the first position of introduction towards the second operating position. This determines, therefore, a relative approaching movement between the bottom 212 and the top 210, which in turn locks the tank 100, which is arranged inside the housing 203, between the bottom 212 and the top 210.

In other words, said last combination of characteristics makes it possible to define a clamping system suited to hold the tank 100 in a well-defined and invariable position with respect to the underlying radiation source and to the overlying modelling plate 204 when the tank 100 is arranged in said second operating position.

From an operational point of view, therefore, in the stereolithography system 1 the supporting structure 202 is placed in said first position of introduction, in such a way as to allow an operator to introduce the tank 100 in the housing 203 in a simplified manner, as shown in FIGS. 5a and 5b.

After the introduction of the tank 100, as shown in FIGS. 6a and 6b, the stereolithography system 1 includes the operation of moving the supporting structure 202 from said first position to the second operating position, in such a way as to arrange the same tank 100 in a position which is suitable for the execution of the actual stereolithography process, as shown in FIGS. 7a and 7b. According to the preferred embodiment, this operation includes also the translation of the radiation emission source and of the moving unit 205.

When moving the supporting structure 202 and thus the tank 100 from the first position to the second position, according to the preferred embodiment of the invention described above, the thrusting unit 214 comes into contact with the bottom 212 of the supporting structure 202 and counteracts its forward movement, thus locking the tank 100 between the bottom 212 and the top 210.

Once said stable position of the tank 100 has been obtained, the stereolithography system 1 of the invention can be activated in order to carry out the actual stereolithography process of the known type.

According to the above, therefore, the stereolithography system that is the subject of the invention achieves all the set objects.

In particular, the invention achieves the object to provide a stereolithography system that makes it possible to produce a three-dimensional object through the solidification in layers of a liquid resin more rapidly compared to the stereolithography machines known in the art, though featuring the same structural complexity as some types of stereolithography machines of the known art.

At the same time, the invention also achieves the object to provide a stereolithography machine which has a simpler structure than some types of stereolithography machines known in the art, though requiring the same processing times for producing the same three-dimensional object.

The invention achieves the further object to provide a stereolithography machine that makes it possible to use a smaller quantity of resin compared to the quantity of resin required when stereolithography machines of the known art are used.

The invention claimed is:

1. A stereolithography system comprising:
a tank suited to contain a light sensitive liquid substance and comprising a bottom delimited by side walls;
a stereolithography machine provided with:
a supporting frame suited to be rested on a substantially horizontal bearing plane;
a supporting structure operatively associated with said supporting frame and defining a housing configured to accommodate said tank in a reversible manner;
a modelling plate facing said bottom in a substantially parallel position when said tank is introduced in said housing;
a moving unit coupled with said supporting frame and configured to move said modelling plate above said tank according to a direction of movement which is substantially perpendicular to said bottom when said tank has been introduced in said housing;
wherein:
said tank comprises a duct made of a deformable material and provided with a first mouth and a second mouth in fluid-dynamic communication respectively with a first end and with a second end of said tank, said duct having at least one section that can be accessed from the outside of said tank and is arranged against a counteracting wall that can be identified on said tank;
said supporting structure is configured so that it assumes, with respect to said supporting frame, at least one first position suitable for the introduction of said tank in said housing and at least one second position according to which said tank is in an inclined position with respect to said bearing plane;
said stereolithography machine comprises counteracting means configured to rotate around their rotation axis, said counteracting means being associated with said supporting frame in such a way that they are not in contact with said section of said duct at the level of said first position and in such a way that they are in contact with said section of said duct on the opposite side of said counteracting wall in said second position.

2. The stereolithography system according to claim 1, wherein said section of said duct is defined along a trajectory in the shape of an arc of a circle.

3. The stereolithography system according to claim 2, wherein said counteracting means comprise a rotor provided with a main body at the centre of which said rotation axis is defined and the periphery of which is coupled with at least one counteracting element which is suited to be placed into contact with said section of said duct on the opposite side of said counteracting wall at the level of said second position in such a way that, in cooperation with said counteracting wall, it narrows said section over a given angular interval during the rotation of said rotor.

4. The stereolithography system according to claim 3, wherein in said second position the rotation axis of said counteracting means substantially passes through the centre of said circle.

5. The stereolithography system according to claim 4, wherein said supporting structure is operatively associated with said supporting frame through inclination means defining a rotation axis which is substantially parallel to said bearing plane and configured to make rotating said supporting structure and said tank when it is introduced in said housing from said first introduction position to said second operating position and vice versa.

6. The stereolithography system according to claim 5, wherein said section of said duct has its concave part facing towards said counteracting means when said tank is introduced in said housing, said rotation axis of said counteracting means and said rotation axis of said inclination means being substantially parallel to each other and to said bearing plane.

7. The stereolithography system according to claim 6, wherein when said tank has been introduced in said housing, said rotation axis of said counteracting means and said section of said duct substantially lie along the same circumference, the centre of which is one of the points of said rotation axis of said inclination means.

8. The stereolithography system according to claim 1, wherein said supporting structure comprises a box-shaped structure which defines said housing and in which it is possible to identify an at least partially open top, at least two side walls projecting from the underside of said top and a bottom operatively associated with said side walls in such a way that it can translate with respect to said side walls according to a direction of translation which is substantially orthogonal to said top, said box-shaped structure being provided with at least one opening configured so as to allow the introduction of said tank in said housing.

9. The stereolithography system according to claim 8, wherein said stereolithography machine is provided with a thrusting unit defined under said box-shaped structure and configured to counteract the movement of said bottom when said box-shaped structure is moved towards said second position, in such a way as to define a relative approaching movement between said bottom and said top and to lock said tank between said bottom and said top.

10. The stereolithography system according to claim 9, wherein said opening is defined at the level of the side of said box-shaped structure opposite the side with which said inclination means are associated.

11. The stereolithography system according to claim 1, wherein said duct in a deformable material is made of an elastomeric material.

\* \* \* \* \*